(12) United States Patent
Payne

(10) Patent No.: US 10,670,142 B1
(45) Date of Patent: Jun. 2, 2020

(54) HYBRID MODULE INCLUDING A TORQUE CONVERTER BYPASS CLUTCH

(71) Applicant: Schaeffler Technologies AG & Co. KG, Herzogenaurach (DE)

(72) Inventor: Matthew Payne, Glenmont, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 11 days.

(21) Appl. No.: 16/195,824

(22) Filed: Nov. 19, 2018

(51) Int. Cl.
| | |
|---|---|
| *F16H 61/14* | (2006.01) |
| *F16H 45/02* | (2006.01) |
| *B60K 6/38* | (2007.10) |
| *F16H 61/4043* | (2010.01) |
| *B60K 6/387* | (2007.10) |
| *F16H 45/00* | (2006.01) |
| *F16H 61/04* | (2006.01) |

(52) U.S. Cl.
CPC .............. *F16H 61/14* (2013.01); *B60K 6/387* (2013.01); *F16H 45/02* (2013.01); *F16H 61/4043* (2013.01); *F16H 2045/002* (2013.01); *F16H 2061/0433* (2013.01)

(58) Field of Classification Search
None
See application file for complete search history.

(56) References Cited

U.S. PATENT DOCUMENTS

| 5,389,046 A * | 2/1995 | Timte ................ F16H 61/0206 475/127 |
| 5,458,540 A * | 10/1995 | Moan ................ F16H 61/0276 474/28 |
| 6,000,510 A * | 12/1999 | Kirkwood .............. F16H 45/02 192/3.29 |

(Continued)

*Primary Examiner* — Colby M Hansen
(74) *Attorney, Agent, or Firm* — Davidson, Davidson & Kappel, LLC

(57) ABSTRACT

A hybrid module configured for arrangement in the torque path upstream from a transmission and downstream from an internal combustion engine includes an electric motor including a stator and a rotor rotatable within the stator, and a torque converter including a cover, an impeller and a turbine. The cover includes a pump drive configured for driving a fluid pump of the transmission. The torque converter includes a bypass clutch configured for frictionally drivingly connecting the cover to the impeller in an engaged orientation and for frictionally drivingly disconnecting the cover from the impeller in a disengaged orientation, the cover being non-rotatably fixed to rotor. The hybrid module also includes a connect/disconnect clutch having a clutch output non-rotatably fixed to the rotor. The connect/disconnect clutch is configured for being actuated between an engaged orientation for drivingly connecting the internal combustion engine to the cover of the torque converter and a disengaged orientation for drivingly disconnecting the internal combustion engine from the cover of the torque converter. The hybrid module is configured for transmitting torque from the internal combustion engine to the pump drive without driving the impeller when the connect/disconnect clutch is in the engaged orientation and the bypass clutch is in the disengaged orientation.

13 Claims, 1 Drawing Sheet

(56) References Cited

U.S. PATENT DOCUMENTS

| | | | | |
|---|---|---|---|---|
| 6,254,507 B1 * | 7/2001 | Downs | ................... | B60K 6/383 |
| | | | | 477/4 |
| 6,494,303 B1 | 12/2002 | Reik et al. | | |
| 9,180,766 B2 | 11/2015 | Frait et al. | | |
| 9,394,981 B2 | 7/2016 | Lindemann et al. | | |
| 2002/0065170 A1 * | 5/2002 | Suzuki | ................... | F16H 61/20 |
| | | | | 477/171 |
| 2008/0032856 A1 * | 2/2008 | Gohring | ................... | B60K 6/48 |
| | | | | 477/5 |

* cited by examiner

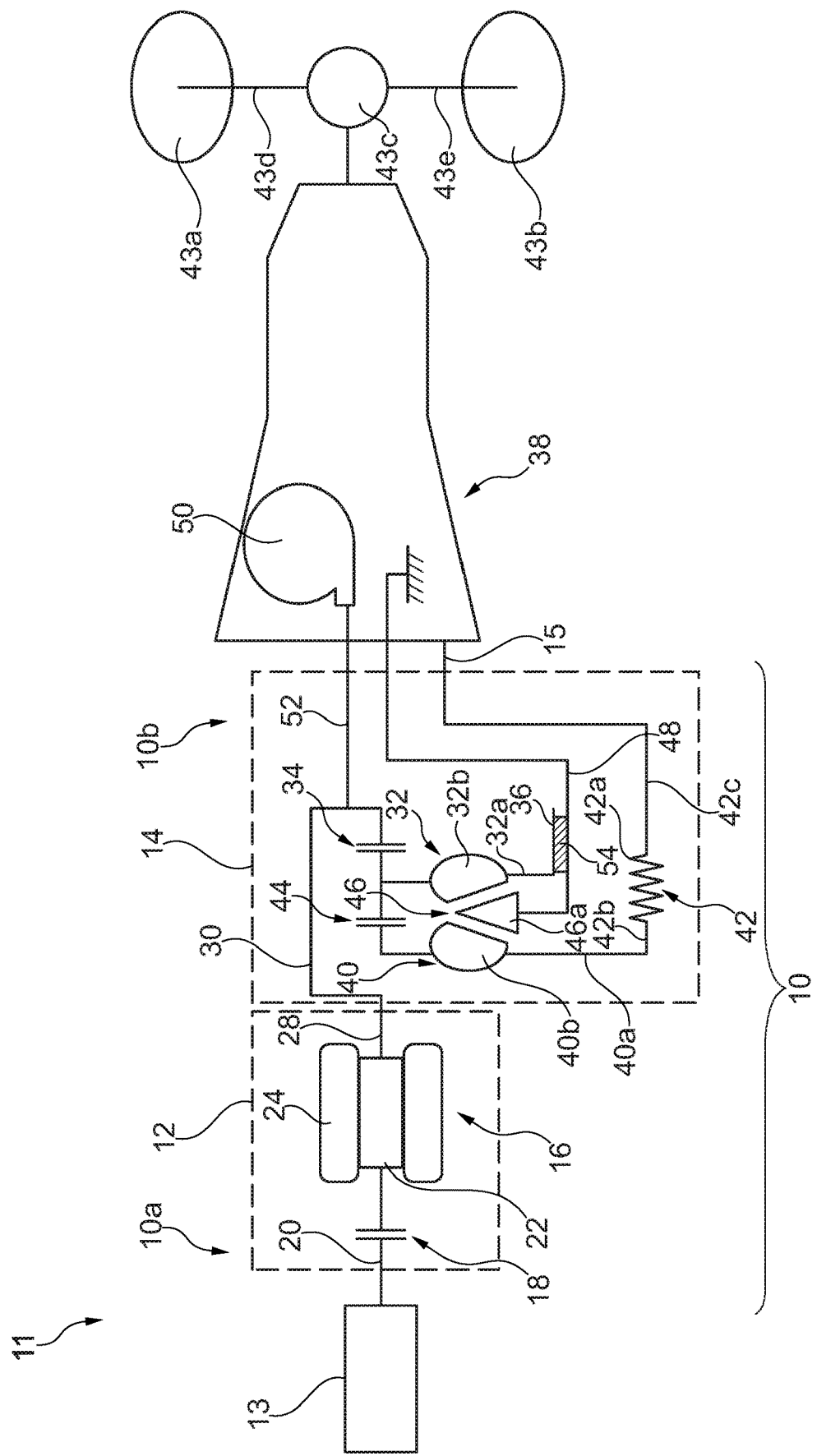

HYBRID MODULE INCLUDING A TORQUE CONVERTER BYPASS CLUTCH

The present disclosure relates generally to hybrid module and more specifically to hybrid modules including torque converters.

BACKGROUND

Hybrid modules including torque converters are known.

SUMMARY OF THE INVENTION

A hybrid module is provided. The hybrid module is configured for arrangement in the torque path upstream from a transmission and downstream from an internal combustion engine includes an electric motor including a stator and a rotor rotatable within the stator, and a torque converter including a cover, an impeller and a turbine. The cover includes a pump drive configured for driving a fluid pump of the transmission. The torque converter includes a bypass clutch configured for frictionally drivingly connecting the cover to the impeller in an engaged orientation and for frictionally drivingly disconnecting the cover from the impeller in a disengaged orientation, the cover being non-rotatably fixed to rotor. The hybrid module also includes a connect/disconnect clutch having an output non-rotatably fixed to the rotor. The connect/disconnect clutch is configured for being actuated between an engaged orientation for drivingly connecting the internal combustion engine to the cover of the torque converter and a disengaged orientation for drivingly disconnecting the internal combustion engine from the cover of the torque converter. The hybrid module is configured for transmitting torque from the internal combustion engine to the pump drive without driving the impeller when the connect/disconnect clutch is in the engaged orientation and the bypass clutch is in the disengaged orientation.

In embodiments of the hybrid module, the torque converter may include a lockup clutch configured for frictionally drivingly connecting the impeller to the turbine in an engaged orientation and for frictionally drivingly disconnecting the impeller from the turbine in a disengaged orientation. The impeller may include an impeller hub. The impeller hub may be drivingly disengaged from the fluid pump of the transmission in the disengaged orientation of the bypass clutch. The torque converter may include a stator connected to a stator shaft and a sealing bushing contacting an inner circumferential surface of the impeller hub and an outer circumferential surface of the stator shaft. The torque converter may include a damper assembly configured for drivingly connecting the turbine to a transmission input shaft of the transmission. The hybrid module may include a connect/disconnect shaft configured for drivingly connecting to the internal combustion engine. The connect/disconnect clutch may be configured for drivingly connecting the connect/disconnect shaft to the cover of the torque converter in the engaged orientation of the connect/disconnect shaft and for drivingly disconnecting the connect/disconnect shaft from the cover of the torque converter in the disengaged orientation of the connect/disconnect shaft.

A motor vehicle drive train is also provided including the hybrid module as and the internal combustion engine. An input of the connect/disconnect clutch is drivingly connected to the internal combustion engine. The motor vehicle drive train also includes the transmission comprising the pump drive. The hybrid module, the internal combustion engine and the transmission are arranged and configured with respect to each other such that the hybrid module transmits torque from the internal combustion engine to the pump drive without driving the impeller when the connect/disconnect clutch is in the engaged orientation and the bypass clutch is in the disengaged orientation.

A method of constructing a hybrid module configured for arrangement in a torque path upstream from a transmission and downstream from an internal combustion engine is provided. The method includes providing a torque converter including a cover, an impeller and a turbine. The cover includes a pump drive configured for driving a fluid pump of the transmission. The torque converter includes a bypass clutch configured for frictionally drivingly connecting the cover to the impeller in an engaged orientation and for frictionally drivingly disconnecting the cover from the impeller in a disengaged orientation. The cover is non-rotatably fixed to rotor. The method also includes non-rotatably connecting the cover of the torque converter to a rotor of an electric motor and non-rotatably connecting an output of a connect/disconnect clutch to the rotor. The connect/disconnect clutch is configured for being actuated between an engaged orientation for drivingly connecting the internal combustion engine to the cover of the torque converter and a disengaged orientation for drivingly disconnecting the internal combustion engine from the cover of the torque converter. The hybrid module is configured for transmitting torque from the internal combustion engine to the pump drive without driving the impeller when the connect/disconnect clutch is in the engaged orientation and the bypass clutch is in the disengaged orientation.

In embodiments of the method, the torque converter includes a lockup clutch configured for frictionally drivingly connecting the impeller to the turbine in an engaged orientation and for frictionally drivingly disconnecting the impeller from the turbine in a disengaged orientation. The impeller may include an impeller hub. The impeller hub may be drivingly disengaged from the fluid pump of the transmission in the disengaged orientation of the bypass clutch. The torque converter may include a stator connected to a stator shaft and a sealing bushing contacting an inner circumferential surface of the impeller hub and an outer circumferential surface of the stator shaft. The torque converter may include a damper assembly configured for drivingly connecting the turbine to a transmission input shaft of the transmission. The method may further include drivingly connecting a connect/disconnect shaft to an input of the connect/disconnect clutch. The connect/disconnect shaft may be configured for drivingly connecting to the internal combustion engine. The connect/disconnect clutch may be configured for drivingly connecting the connect/disconnect shaft to the cover of the torque converter in the engaged orientation of the connect/disconnect clutch and for drivingly disconnecting the connect/disconnect shaft from the cover of the torque converter in the disengaged orientation of the connect/disconnect clutch.

BRIEF DESCRIPTION OF THE DRAWINGS

The present disclosure is described below by reference to the following drawings, in which:

FIG. 1 schematically shows a motor vehicle drive train including a hybrid module in accordance with an embodiment of the present disclosure.

DETAILED DESCRIPTION

The present disclosure provides hybrid modules that allows the hybrid vehicle in which the hybrid module is included to be used for example on a jobsite or when camping to generate power without rotating the impeller of the torque converter. Because the impeller is non-rotatably fixed to the transmission fluid pump in conventional hybrid modules and the transmission pump is used to actuate a disconnect/connect clutch for connecting the internal combustion engine to and disconnecting the internal combustion engine from the torque converter cover, a parasitic loss occurs from rotating the torque converter impeller in conventional hybrid modules to generate power using the hybrid vehicle. The hybrid modules of the present disclosure can disconnect the torque converter impeller while still spinning the transmission fluid pump, providing pressure to the disconnect/connect clutch.

FIG. 1 shows a schematic view of a hybrid motor vehicle drive train 11 including a hybrid module 10 in accordance with an embodiment of the present invention. Module 10 includes a hybrid drive unit 12 configured for attachment to an internal combustion engine 13 at a front side 10a of module 10 and a torque converter 14 configured for attachment to a transmission input shaft 15 at a rear side 10b of module 10. Hybrid drive unit 12 is selectively operable to transmit torque from the internal combustion engine 13 to torque converter 14 or directly drive torque converter 14 via an electric motor 16 of drive unit 12. Along these lines, hybrid drive unit 12 includes an engine connect/disconnect clutch 18 for selectively connecting torque converter 14 to a connect/disconnect shaft 20, which is configured for non-rotatably connecting for example via a flywheel to a crankshaft of the internal combustion engine 13, or disconnecting torque converter 14 from shaft 20 such that torque converter can be driven solely by electric motor 16.

Electric motor 16 includes a stator 22 and a rotor 24, with stator 22 being non-rotatably fixed to, i.e., statically mounted on, a housing of hybrid module 10. Upon current being provided to coils of stator 22, rotor 24 is rotated about a center axis of motor 16, due to rotor 24 including a plurality of annular rotor segments that each include a plurality of circumferentially space magnets, which in at least some preferred embodiments are permanent magnets, that are energized by the current in the coils. Rotor 24 may non-rotatably fixed to a rotor carrier 28 such that rotor 24 and rotor carrier 28 rotate together about the center axis of the motor 16.

Torque converter 14 includes a shell or cover 30 that is rigidly and non-rotatably fixed to rotor 22 via rotor carrier 28. More specifically, a front portion of cover 30 may be fixed directly to rotor carrier 28 for example by fasteners, such as rivets, or welding. A rear portion of cover 30 surrounds an impeller 32 of torque converter 14. Impeller 32 is separate and distinct from cover 30 and can be engaged to and disengaged from cover 30 via a torque converter bypass clutch in the form of an impeller friction clutch 34. Impeller 32 includes an impeller shell 32a supporting a plurality of impeller blades 32b. A cylindrical impeller hub 36 is non-rotatably fixed to a radially inner end of the impeller shell 32a and protrudes axially away from a radially inner end of impeller shell 32a toward the transmission 38.

Impeller friction clutch 34 may be formed by an inner radially extending surface of cover 30 and an outer radially extending surface of impeller shell 32a being frictionally connectable to each other via a friction surface on at least one of impeller shell 32a and cover 30. Impeller 32 is axially movable by fluid pressure, and thus acts as a piston, such that impeller shell 32a can be forced into engagement with cover 30 to frictionally drivingly engage impeller shell 32a and cover 30 for rotation together at the same speed, and such that impeller shell 32a can be forced away from cover 30 and out of engagement with cover 30 such that cover 30 can be rotated while impeller 32 is not rotated. Impeller 32 can only receive torque and transmit torque to turbine 40 when impeller friction clutch 34 is engaged and impeller 32 is thus connected to cover 30.

Torque converter 14 also includes a turbine 40 that includes a turbine shell 40a supporting a plurality of turbine blades 40b. A damper assembly 42, which may include springs 42a for damping torsional vibrations, may be drivingly fixed to turbine 40 at an input thereof and may be configured for connecting to input shaft 15 of transmission at an output thereof. Damper assembly 42 includes an input part 42b that is non-rotatably fixed to turbine 40 and an output part 42c that is configured for non-rotatably connecting to transmission input shaft 15 of transmission 38. Input part 42b and output part 42c are drivingly connected by springs 42a such that relative rotation of parts 42b, 42c occurs via the compression and expansion of springs 42a. In other words, springs 42a receive torque from input part 42b and transfer the torque to output part 42c. Damper assembly 42 is configured for receiving torque from turbine shell 40a and transferring torque to the transmission input shaft 15 while damping torsional vibrations of the input torque. Transmission 15 may then drive wheels 43a, 43b by transferring torque received from torque converter 14 through a differential 43c and axles 43d, 43e.

For frictionally engaging turbine 40 and impeller 32 together, torque converter 14 includes a turbine lockup clutch 44. When lockup clutch 44 is engaged, lockup clutch 44 non-rotatably fixes turbine 40 and impeller 32 together for rotation about a center axis of torque converter 14 at the same speed. When lockup clutch 44 is disengaged, turbine 40 and impeller may be rotated about a center axis of torque converter 14 at different speeds than each other.

In some embodiments, turbine 40 may be configured to define a piston that is axially moveable toward and away from impeller shell 32a such that an engagement section of turbine 40 engages an engagement section of impeller shell 32a so as to form the lockup clutch 44. A friction material may be bonded onto a radially extending impeller facing surface of an outer radial extension of turbine shell 40a radially outside of blades 40a and forms the engagement section of turbine 40, for engaging a radially extending wall of impeller shell 32a, which is radially outside of blades 32b and forms the engagement section of impeller shell 32a. Accordingly, the friction material may be provided axially between the outer radial extension of turbine shell 40a and the radially wall of impeller shell 32a to selectively rotationally engage the engagement section of turbine 40 with the engagement section of impeller 32. In other embodiments, lockup clutch 44 may include a piston and one or more clutch plates that are distinct and separate from impeller 32 and turbine 40. When impeller friction clutch 34 is engaged and impeller 32 is driven via cover 30, impeller 32 drives turbine 40 via fluid flow from impeller blades 32b to turbine blades 40, when the lockup clutch 44 is disengaged, or impeller 32 drives turbine 40 via the friction material, when lockup clutch 44 is engaged. Turbine 40 then drives damper assembly 40, which in turn drives the transmission input shaft 15.

Torque converter 14 also includes a stator 46 axially between turbine 40 and impeller 32 including a plurality of circumferentially spaced stator blades 46a to redirect fluid flowing from the turbine blades 40b before the fluid reaches impeller blades 32b to increase the efficiency of torque converter 14. Torque converter 14 also includes a stator shaft 48 that is configured for being fixed to transmission 38. Stator shaft 48 may be fixed to stator 46 by a one-way clutch provided on an outer circumferential surface of stator shaft 48. Stator shaft 48 may be non-rotatably fixed to transmission 38 such that it is stationary and the one-way clutch, in a known manner, allows stator 46 to rotate about the center axis of torque converter 14 in a free-wheeling manner in a first rotational direction and prevents stator 46 from rotating about the center axis of torque converter 14 in a second rotational direction. A sealing bushing 54 is provided in contact with the outer circumferential surface of stator shaft 48 and the inner circumferential surface of impeller hub 36 such that fluid is prevented from leaking out between stator shaft 48 and impeller hub 36 and impeller hub 36 is rotatably supported on stator shaft 48 via bushing 54.

Clutch 18 may include a plurality of clutch plates and a piston that is axially slidable along to engage and disengage the clutch plates. When the piston is forced against the clutch plates, clutch 18 is engaged and torque from engine 13 is transmitted via shaft 20 through clutch 18 into torque converter cover 30 via rotor carrier 28. When the piston is held away from the clutch plates, clutch 18 is disengaged so torque from engine 13 is not transmitted through the clutch plates into rotor 22. Torque is then transmitted from rotor 22 to torque converter cover 30 via rotor carrier 28. Accordingly, clutch 18 is configured for being actuated between an engaged orientation for drivingly connecting shaft 20 and engine 13 to torque converter cover 30 and a disengaged orientation for drivingly disconnecting shaft 20 and engine 13 from torque converter cover 30.

The rear portion of torque converter cover 30 is non-rotatably fixed to a fluid pump 50 of transmission 38 by a pump drive 52 of cover 30. Pump drive 52 may be configured as gearing configured for drivingly connecting to gearing of pump 50. In contrast to the arrangement of conventional hybrid modules, impeller hub 36 is thus not provided with a pump drive for driving pump 50; instead, impeller hub 36 is drivingly disengagable from pump 50 in the disengaged orientation of impeller friction clutch 34. Transmission fluid pump 50 is driven by torque converter cover 30 during operation via the rotation of cover 30. As pump 50 is being driven, pump 50 can supply transmission fluid to connect/disconnect clutch 18 in order to engage clutch 18 so that internal combustion engine 13 can be used to generate electricity by rotating rotor 24 in stator 22 without driving wheels 43a, 43b. In order to prevent parasitic energy loss, impeller friction clutch 34 is disengaged so that impeller 32 is disconnected from cover 30, and impeller 32, turbine 40 and stator 46 (and half of one clutch pack in the transmission 38) do not rotate with cover 30 as pump 50 is driven to engage clutch 18. Accordingly, drive train 11 does not drive wheels 43a, 43b when impeller friction clutch 34 is disengaged, but is merely used to generate electricity by spinning rotor 24 within stator 22.

The embodiment shown in FIG. 1 allows engine 13 to run at optimal generator speed and torque with clutch 18 connected and impeller friction clutch 34 disconnected. This allows the system to generate electricity at a peak efficiency while still powering the mechanical fluid pump 50 in the transmission 38, which supplies clutch 18 with apply pressure and motor 16 with fluid cooling flow.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
10a front side
10b rear side
11 hybrid motor vehicle drive train
12 hybrid drive unit
13 internal combustion engine
14 torque converter
15 transmission input shaft
16 electric motor
18 engine connect/disconnect clutch
20 connect/disconnect shaft
22 stator
24 rotor
28 rotor carrier
30 torque converter cover
32 impeller
32a impeller shell
32b impeller blades
34 torque converter bypass clutch (impeller friction clutch)
36 impeller hub
38 transmission
40 turbine
40a turbine shell
40b turbine blades
42 damper assembly
42a springs
42b damper input part
42c damper output part
43a, 43b wheels
43c differential
43d, 43e axles
44 lockup clutch
46 stator
48 stator shaft
50 transmission fluid pump
52 pump drive
54 sealing bushing

What is claimed is:

1. A hybrid module configured for arrangement in a torque path upstream from a transmission and downstream from an internal combustion engine, the hybrid module comprising:
   an electric motor including a stator and a rotor rotatable within the stator;
   a torque converter including a cover, an impeller and a turbine, the cover including a pump drive configured for driving a fluid pump of the transmission, the torque converter including a bypass clutch configured for drivingly connecting the cover to the impeller in an engaged orientation and for drivingly disconnecting the cover from the impeller in a disengaged orientation, the cover being non-rotatably fixed to rotor;
   a connect/disconnect clutch having an output non-rotatably fixed to the rotor, the connect/disconnect clutch configured for being actuated between an engaged orientation for drivingly connecting the internal combustion engine to the cover of the torque converter and a disengaged orientation for drivingly disconnecting the internal combustion engine from the cover of the torque converter, the hybrid module being configured for transmitting torque from the internal combustion engine to the pump drive without driving the impeller when the connect/disconnect clutch is in the engaged orientation and the bypass clutch is in the disengaged orientation.

2. The hybrid module as recited in claim 1 wherein the torque converter includes a lockup clutch configured for frictionally drivingly connecting the impeller to the turbine in an engaged orientation and for frictionally drivingly disconnecting the impeller from the turbine in a disengaged orientation.

3. The hybrid module as recited in claim 1 wherein the impeller includes an impeller hub, the impeller hub being drivingly disengaged from the fluid pump of the transmission in the disengaged orientation of the bypass clutch.

4. The hybrid module as recited in claim 3 wherein the torque converter includes a stator connected to a stator shaft and a sealing bushing contacting an inner circumferential surface of the impeller hub and an outer circumferential surface of the stator shaft.

5. The hybrid module as recited in claim 1 wherein the torque converter includes a damper assembly configured for drivingly connecting the turbine to a transmission input shaft of the transmission.

6. The hybrid module as recited in claim 1 further comprising a connect/disconnect shaft configured for drivingly connecting to the internal combustion engine, the connect/disconnect clutch configured for drivingly connecting the connect/disconnect shaft to the cover of the torque converter in the engaged orientation of the connect/disconnect shaft and for drivingly disconnecting the connect/disconnect shaft from the cover of the torque converter in the disengaged orientation of the connect/disconnect shaft.

7. A motor vehicle drive train comprising:
the hybrid module as recited in claim 1;
the internal combustion engine, an input of the connect/disconnect clutch being drivingly connected to the internal combustion engine; and
the transmission comprising the pump drive,
the hybrid module, the internal combustion engine and the transmission being arranged and configured with respect to each other such that the hybrid module transmits torque from the internal combustion engine to the pump drive without driving the impeller when the connect/disconnect clutch is in the engaged orientation and the bypass clutch is in the disengaged orientation.

8. A method of constructing a hybrid module configured for arrangement in a torque path upstream from a transmission and downstream from an internal combustion engine, the method comprising:
providing a torque converter including a cover, an impeller and a turbine, the cover including a pump drive configured for driving a fluid pump of the transmission, the torque converter including a bypass clutch configured for drivingly connecting the cover to the impeller in an engaged orientation and for drivingly disconnecting the cover from the impeller in a disengaged orientation;
non-rotatably connecting the cover of the torque converter to a rotor of an electric motor; and
non-rotatably connecting an output of a connect/disconnect clutch to the rotor, the connect/disconnect clutch being configured for being actuated between an engaged orientation for drivingly connecting the internal combustion engine to the cover of the torque converter and a disengaged orientation for drivingly disconnecting the internal combustion engine from the cover of the torque converter, the hybrid module being configured for transmitting torque from the internal combustion engine to the pump drive without driving the impeller when the connect/disconnect clutch is in the engaged orientation and the bypass clutch is in the disengaged orientation.

9. The method as recited in claim 8 wherein the torque converter includes a lockup clutch configured for frictionally drivingly connecting the impeller to the turbine in an engaged orientation and for frictionally drivingly disconnecting the impeller from the turbine in a disengaged orientation.

10. The method as recited in claim 8 wherein the impeller includes an impeller hub, the impeller hub being drivingly disengaged from the fluid pump of the transmission in the disengaged orientation of the bypass clutch.

11. The method as recited in claim 10 wherein the torque converter includes a stator connected to a stator shaft and a sealing bushing contacting an inner circumferential surface of the impeller hub and an outer circumferential surface of the stator shaft.

12. The method as recited in claim 8 wherein the torque converter includes a damper assembly configured for drivingly connecting the turbine to a transmission input shaft of the transmission.

13. The method as recited in claim 8 further comprising drivingly connecting a connect/disconnect shaft to an input of the connect/disconnect clutch, the connect/disconnect shaft being configured for drivingly connecting to the internal combustion engine, the connect/disconnect clutch configured for drivingly connecting the connect/disconnect shaft to the cover of the torque converter in the engaged orientation of the connect/disconnect clutch and for drivingly disconnecting the connect/disconnect shaft from the cover of the torque converter in the disengaged orientation of the connect/disconnect clutch.

* * * * *